United States Patent [19]

Hornewer et al.

[11] Patent Number: 5,385,130
[45] Date of Patent: Jan. 31, 1995

[54] PROCESS FOR CONTROLLING THE EXHAUST GAS RECIRCULATION SYSTEM OF AN INTERNAL COMBUSTION ENGINE

[75] Inventors: Jean-Marc Hornewer, Cergy-le-Haut; Daniel Cozler, Maurecourt, both of France

[73] Assignee: Societe Anonyme Dite Regie Nationale des Usines Renault, Boulogne-Billancourt, France

[21] Appl. No.: 156,684

[22] Filed: Nov. 24, 1993

[30] Foreign Application Priority Data

Nov. 24, 1992 [FR] France ................ 92 14071

[51] Int. Cl.[6] ............... F02D 41/04; F02M 25/07
[52] U.S. Cl. ............................... 123/436; 123/571
[58] Field of Search ............. 123/436, 571; 73/117.3, 73/118.2; 364/431.06, 431.08

[56] References Cited

U.S. PATENT DOCUMENTS

| | | | |
|---|---|---|---|
| 4,724,813 | 2/1988 | Cinpinski | 123/436 |
| 5,060,618 | 10/1991 | Takaoka et al. | 123/436 |
| 5,226,390 | 7/1993 | Nakagawa | 123/436 |
| 5,265,575 | 11/1993 | Norota | 123/436 |

FOREIGN PATENT DOCUMENTS

| | | |
|---|---|---|
| 0440173A2 | 8/1991 | European Pat. Off. . |
| 0490392A2 | 6/1992 | European Pat. Off. . |
| 4122377 | 1/1992 | Germany . |
| 58-160530 | 9/1983 | Japan . |
| 2-221668 | 9/1990 | Japan . |

*Primary Examiner*—Willis R. Wolfe
*Attorney, Agent, or Firm*—Oblon, Spivak, McClelland, Maier, & Neustadt

[57] ABSTRACT

Process for controlling the exhaust gas recirculation system of an internal combustion engine 1 of the type comprising a pipe (4) assuring the connection between the exhaust manifold (3) and the intake manifold (2), said pipe being equipped with an E.G.R. valve (5) controlled from the electronic system (6) for engine control to assure the recirculation of a given rate of exhaust gas, characterized in that said engine control system is equipped with means for calculating the values $Tm\_i$ of a representative magnitude of the torque produced by each of the combustions of the engine and in that the opening of the E.G.R. valve is controlled, for given operating conditions of the engine, as a function of said values $Tm\_i$.

16 Claims, 3 Drawing Sheets

PROCESS FOR CONTROLLING THE EXHAUST GAS RECIRCULATION SYSTEM OF AN INTERNAL COMBUSTION ENGINE

BACKGROUND OF THE INVENTION

1. Field of the Invention

This invention relates to a process for controlling the system for recirculation of the exhaust gases at the intake of an internal combustion engine that equips in particular a motor vehicle.

2. Discussion of the Background

The standards relating to pollution and the consumption of the internal combustion engines that equip motor vehicles, become more severe each day in all industrialized countries. The automobile industry is therefore today busy finding technical solutions to meet these obligations and this, without restricting too much the performances of the engines or adversely affecting their cost.

A known technique for pollution control of internal combustion engines consists in performing the recirculation of the exhaust gases to reduce the emissions of pollutants and more particularly nitric oxides. This technique, called E.G.R. (Exhaust Gas Recirculation), consists in reinjecting a portion of the exhaust gases into the intake manifold of the engine, which has the effect of reducing the amount of gas to be burned and consequently of lowering the combustion temperature, hence a reduction of the production of NOx's or nitric oxides.

The device most often adopted for use is that of the external recirculation, as opposed to the internal recirculation caused by the crossing of the intake and exhaust pipes. To do this, a connecting duct connects the exhaust manifold and the intake manifold, the exhaust gases are then sucked through this duct by the natural partial vacuum of the engine and reintroduced at the intake into the flow of combustion air. The duct is equipped with a valve that makes it possible to control the amount of exhaust gases reintroduced at the intake depending on the operating conditions of the engine and in particular depending on the level of power required of the engine. To do this, the valve, generally called an E.G.R. valve, is directly controlled by the electronic system for engine control that adjusts the recirculation rates depending on the operating phases of the engine.

This E.G.R. valve, however, exhibits the drawback of being subject to losses of adjustment that can cause malfunctioning of the engine and therefore increased emissions of polluting substances. Actually, the E.G.R. valve is subjected to the attack of the highly corrosive exhaust gases and its gradual fouling tends to change the characteristics of the flow of the exhaust gases for the same instruction issued by the engine control system.

In the context of future antipollution regulations such as the U.S. standard OBD2 (On Board Diagnostic Level 2), it is provided that the electronic systems for engine control that equip the particular vehicles are induced to diagnose and/or correct automatically certain engine faults which have an impact on the emissions of pollutants.

Thus, it is provided to install in future electronic systems for engine control, devices that are capable of detecting, while driving, faults relating in particular to the operation of the E.G.R. system. These faults will cause, when there is a failure of an element acting on the level of pollution, either the activation of degraded modes of operation and/or the lighting of a warning light on the instrument panel informing the driver (not very harsh regulations), or will require that corrective measures be taken or that the vehicle be stopped (strict regulations).

Automobile designers and outfitters have therefore developed a certain number of techniques for controlling the operation of the E.G.R. valve.

By way of example, it is possible to cite the use of Venturi tubes on the pipe coming out of the E.G.R. valve, of means for controlling the movement of the needle of the valve, or further, of temperature probes, etc.

It is also possible to cite the control process described in patent application No. FR-A-2,674,574, characterized in that the gas intake load in the engine is measured upstream and downstream from the outlet of the recycling pipe, before and after the control on opening or on closing of the valve, the load measurements upstream from the outlet are compared first to be assured of a stabilized operation of the engine, then if such is the case, the engine load measurements downstream from the outlet of the recycling pipe are compared before and after controlling the valve, to determine a proper operation of the valve in case of difference between these measurements and a malfunctioning of it in case of equality between these measurements.

This device makes it possible to detect the nonoperation of the E.G.R. valve but not a degraded operation, further this device like all devices proposed in the prior art, exhibits a certain number of drawbacks at the level of the complexity of its structure, its difficult installation in the engine and the reliability itself of the means added to control the operation of the E.G.R. valve.

SUMMARY OF THE INVENTION

The purpose of the invention is therefore to eliminate the drawbacks of the prior art by proposing a process for controlling the recirculation system that makes possible a diagnosis of the E.G.R. valve and that makes it possible, consequently, to adapt the control of the engine control system to take into account the possible deviation of the operation of the valve, thanks to a closed-loop correction.

Furthermore, the process according to the invention offers a cost/benefit ratio that is much more favorable than the processes of the prior art. Actually, it uses no specific equipment and requires only a slight software excess cost.

The process for controlling the exhaust gas recirculation system of an internal combustion engine according to the invention, relates to a recirculation system of the type comprising a pipe assuring the connection between the exhaust manifold and the intake manifold, the pipe being equipped with an E.G.R. valve controlled from the electronic system for engine control to assure the recirculation of a given rate of exhaust gas.

According to the invention, the process is characterized in that the engine control system is equipped with means for calculating the values $Tm\_i$ of a representative magnitude of the torque produced by each of the combustions of the engine and in that the opening of the E.G.R. valve is controlled, for given operating conditions of the engine, as a function of said values $Tm\_i$.

According to another characteristic of the invention, the process for controlling the exhaust gas recirculation system comprises the following operations:

control the E.G.R. valve from the operating conditions of the engine to obtain a predetermined exhaust gas recirculation rate R;

then calculate from each representative value $Tm\_i$ of the torque, a representative statistical magnitude $ATm\_i$ of the average of the values $Tm\_i$;

calculate the deviation $DTm\_i$ of the value $Tm\_i$ from the average $ATm\_i$;

associate with each value $DTm\_i$, and depending on the operating conditions of the engine, a value $Ra\_i$ corresponding to the rate of exhaust gas actually recirculated;

compare the value $Ra\_i$ with the value R of the rate of recirculation initially controlled and deduce from it, in case of difference, a malfunction of the E.G.R. valve.

According to another characteristic of the process that is the object of the invention, depending on the value $Ra\_i$ obtained, the E.G.R. valve is controlled on opening and on closing so as to cause the actual rate Ra of recirculated exhaust gas to converge on the rate R.

According to another characteristic of the process that is the object of the invention, the values $ATm\_i$ of said statistical magnitude are calculated from the following formula:

$$ATm\_i = ATm\_i-1 + ((Tm\_i - (ATm\_i-1))/F1$$

where F1 is a filtering constant and where $ATm\_0 = 0$.

According to another characteristic of the process that is the object of the invention, the value $DTm\_i$ is defined as being the standard deviation between $Tm\_i$ and $ATm\_i$.

According to another characteristic of the process that is the object of the invention, the values $Ra\_i$ of the actual rate of recirculation of the exhaust gases at the intake are deduced from a specific mapping contained in the engine control system.

BRIEF DESCRIPTION OF THE DRAWINGS

The objects, aspects and advantages of this invention will be better understood according to the description given below of embodiments of the invention applied to a four-stroke and four-cylinder engine, these embodiments being given by way of nonlimiting examples, with reference to the accompanying drawing, in which.

DESCRIPTION OF THE PREFERRED EMBODIMENTS

Figure 1:
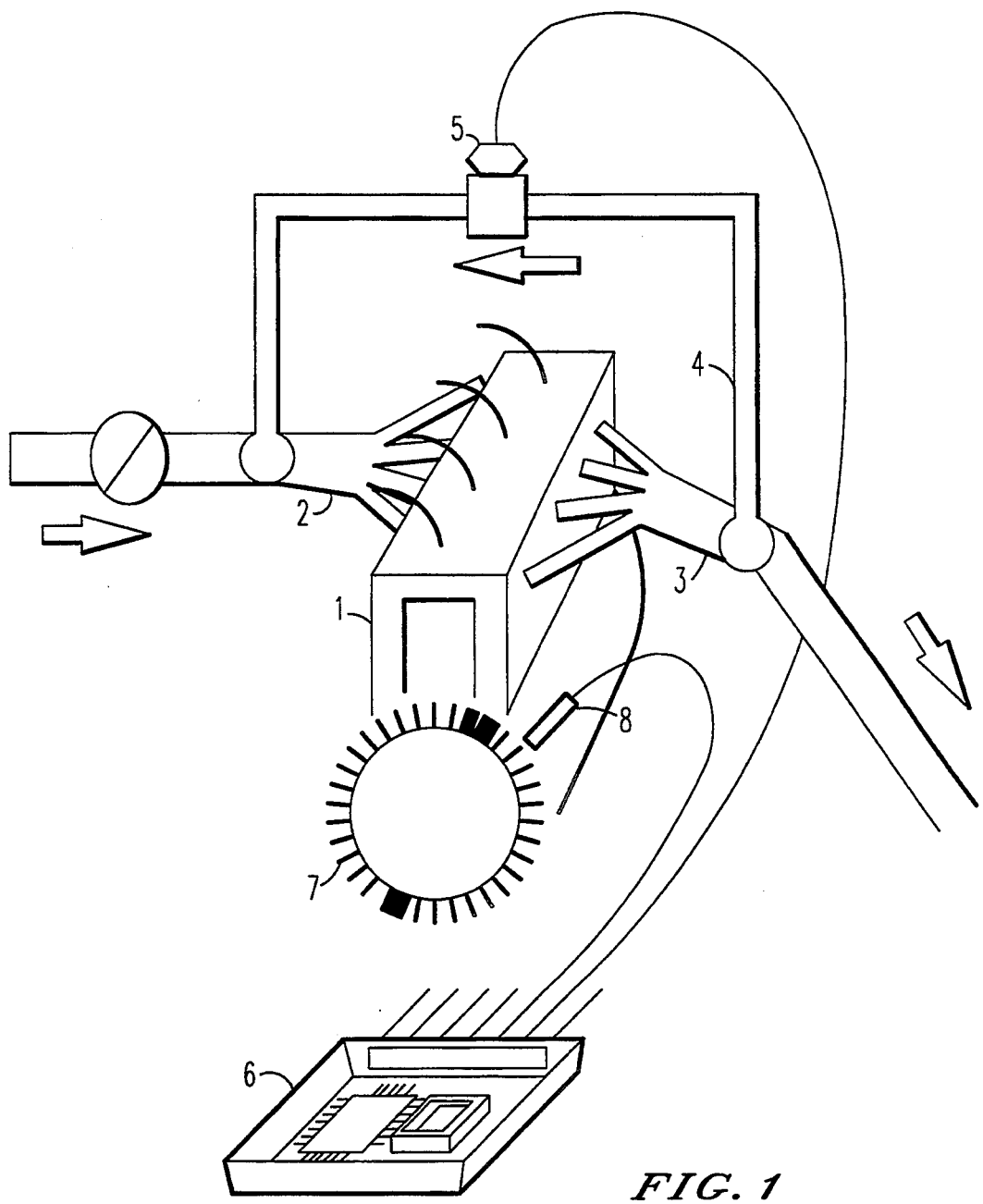
FIG. 1 represents diagrammatically a control device of the exhaust gas recirculation system for using the process according to the invention.

FIG. 1 therefore describes an internal combustion engine using the process for controlling the exhaust gas recirculation system. Only the elements necessary for the understanding of the invention have been shown.

The internal combustion engine shown, for example of the four-stroke and four-cylinder in-line type, referenced 1, is equipped with a system for outer recirculation of the exhaust gases. A connecting pipe 4 assures the recirculation of the exhaust gases between pipe 3 for exhaust of the burnt gases and manifold 2 for intake of the combustion gases into the cylinders of the engine, the direction of circulation of the gases is represented by arrows.

An E.G.R. valve 5 equips connecting pipe 4 so as to control the amount of exhaust gas admitted for recirculation. This valve 5 is controlled by electronic system 6 for engine control, the latter controlling the opening of valve 5 to obtain a predetermined rate of exhaust gases present in the combustion gases depending on the operating conditions of the engine.

Engine control system 6 comprises in a standard way a computer comprising a CPU, a random access memory (RAM), a read only memory (ROM), analog to digital (A/D) converters, and different input and output interfaces. It receives different input signals relating to the operation of the engine (load, speed, water temperature, manifold pressure, etc.), and peripheral elements, performs operations and generates output signals destined in particular for the fuel injectors and for the sparkplugs and therefore for E.G.R. valve 5. Thus, a predetermined mapping for the test stand is installed in the memory of the engine control system so that the latter determines for each engine operating condition a signal for controlling the E.G.R. valve corresponding to the desired recirculation rate.

According to the process that is the object of the invention, among the calculations performed by the engine control system appears the one of a magnitude Tm deduced from the rotation of the drive shaft and representative of the gas torque produced by each of the combustions of the engine. This value is deduced from the observation of the rotation of a measuring ring gear 7, integral with the flywheel of the engine, for example the standard type ring gear mounted on electronic ignition engines.

Associated with ring gear 7 is a stationary sensor 8, for example variable-reluctance, which delivers an alternating signal with a frequency proportional to the speed of advance of the teeth of the ring gear, i.e. representative of the instantaneous speed of the flywheel. The passage of this alternating signal, with a frequency proportional to the speed of advance of the teeth of the ring gear, at the representative value Tm of the gas torque produced by each combustion of the gas mixture in the cylinders of the engine, is performed by a process detailed in the French patent applications filed by the applicant under numbers 91/11273 and 91/11274, relating to a "process and device for measuring the torque of an internal combustion heat engine."

The object of the process for controlling the exhaust gas recirculation system according to the invention, is to use this gas torque information already used by the engine control system for other applications such as cylinder recognition or detection of combustion misfires, to control the exhaust gas recirculation system and particularly the operation of the E.G.R. valve.

Figure 3:
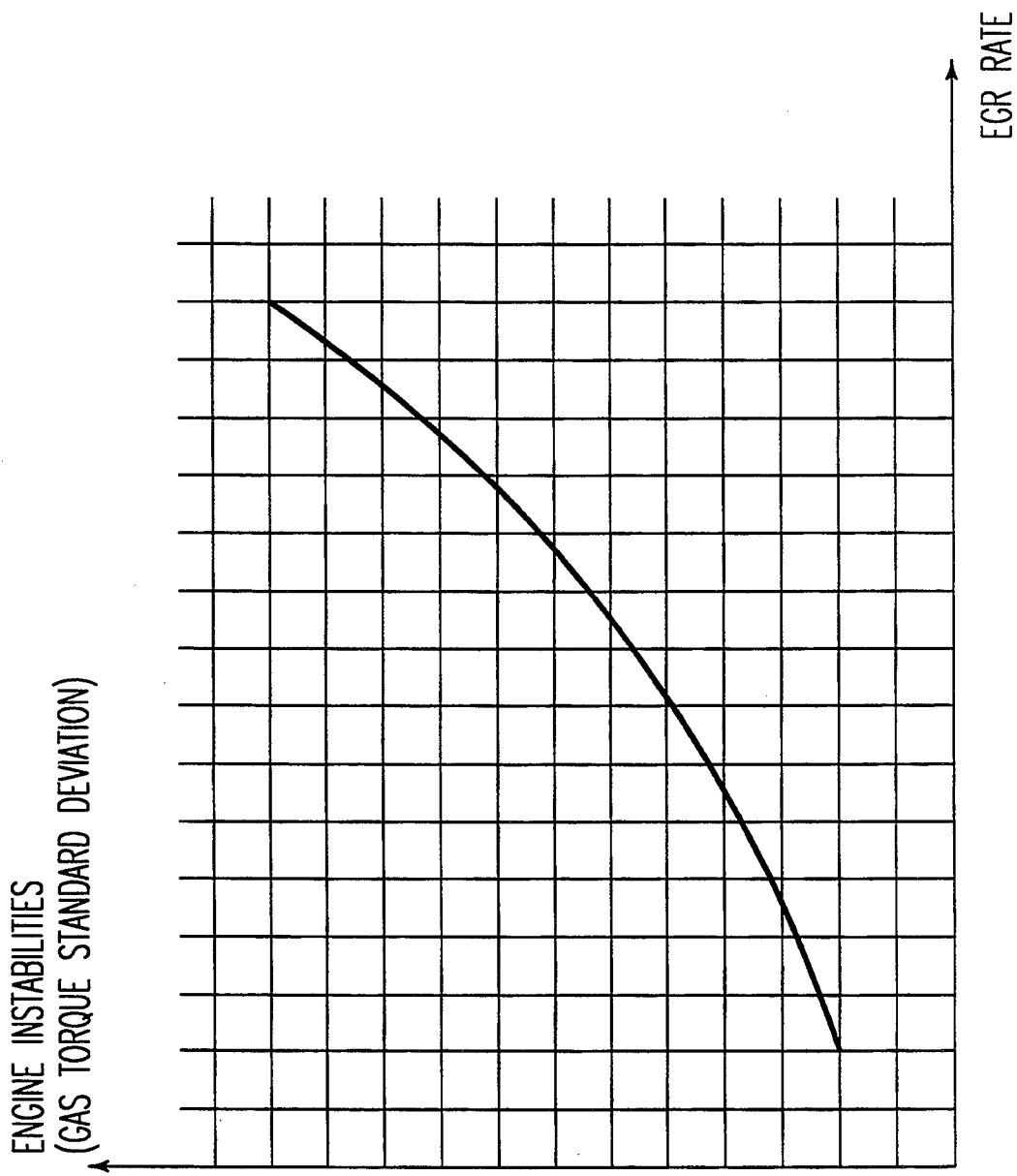
FIG. 3 is a graph showing the influence of the recirculation rate on the standard deviation of the gas torque of the internal combustion engine.

This use is made possible thanks to the following finding illustrated by the graph of FIG. 3. The applicant has observed that under given engine operating conditions, the instabilities of the engine (i.e., the variations of the characteristics of the combustions and therefore the variations of the gas torque) are directly connected to the amount of recirculated exhaust gas. It is thus possible, knowing the level of instability of the engine, to deduce the E.G.R. rate. Now, the instabilities of the engine are directly quantifiable from the knowledge of the gas torque of the engine and more specifically, of the standard deviation of the latter.

Thus, by following the level of the instabilities of the engine, through the variations of the gas torque, it is possible to follow the rate of recirculation of the exhaust gases, all things being equal moreover, and therefore to diagnose the operation of E.G.R. valve 5 by comparing the actual rate of recirculated gas and the instruction rate and to deduce from it a system for controlling this valve 5 in a closed loop.

Figure 2:
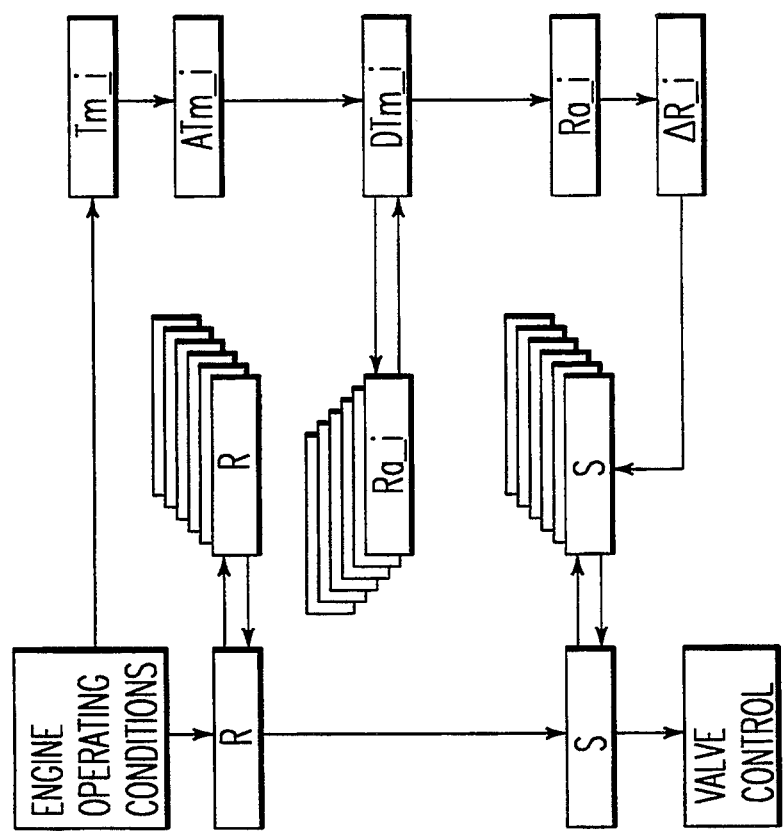
FIG. 2 represents a flowchart illustrating the operation of the process according to the invention.

The process for controlling the gas recirculation system used by the engine control system therefore comprises the following steps, illustrated by the flowchart of FIG. 2.

Engine control system 6 controls E.G.R. valve 5, from the engine operating conditions, to generate a predetermined exhaust gas recirculation rate R. This value R of the E.G.R. rate is read into a table or mapping initially stored in the engine control system. The control of the E.G.R. valve is performed from an opening signal S corresponding to the instruction value R from a table of appropriate and determined correspondence.

The successive values of the gas torque Tm, produced for each combustion by the appropriate calculating means from the analysis of the rotation of the target 7, then are the object of a specific processing making it possible to control the actual rate of recirculated exhaust gas.

From each representative value $Tm\_i$ of the gas torque caused by the $i^{th}$ combustion, a representative statistical magnitude $ATm\_i$ of the average of the values $Tm\_i$ over a given horizon of combustions. This average value is traditionally obtained by a numeric filtering of the first order: the values $ATm\_i$ are calculated from the following formula:

$$ATm\_i = ATm\_i - 1 + ((Tm\_i - (ATm\_i - 1))/F1)$$

where F1 is a filtering constant and where $ATm\_0 = 0$.

Then the deviation $DTm\_i$ is calculated of the value $Tm\_i$ from the average $ATm\_i$ thus obtained. This deviation is calculated preferably with the formula of the standard deviation:

$$DTm\_i = ([(ATm\_i)^2 - (tm\_i)^2])^{\frac{1}{2}}$$

Then there is associated with each value $DTm\_i$, and depending on the engine operating conditions, a value $Ra\_i$ corresponding to the rate of exhaust gas actually recirculated. This value is read into a table or mapping initially stored in the engine control system. This table is developed from measurements made on the test stand and reproduced in FIG. 3.

It is then enough to compare the value $Ra\_i$ with the value R of the recirculation rate initially controlled to deduce from it, in case of difference, a malfunction of the E.G.R. valve.

The engine control system then controls the E.G.R. valve by modifying the value of the opening signal S corresponding to the desired rate R. When the rate Ra has converged on the rate R, the signal for opening corresponding valve 5 is then stored and replaces the previously contained value. Thus, when the engine will again be under the same operating conditions, the corrections eliminating the operating deviations of valve 5, are immediately operational.

Of course, the invention is in no way limited to the embodiment described and illustrated which has been given only by way of example.

On the other hand, the invention comprises all the technical equivalents of the means described as well as their combinations if they are made according to its spirit.

This regulation of the E.G.R. rate can be performed in various forms:

either with analog electronic components for which the adders, comparators and other filters are made with operational amplifiers;

or with digital electronic components that would perform the hard-wired logic function;

or by an algorithm for processing the signal installed in the form of a software module forming a software system for engine control that causes the microcontroller of an electronic computer to operate.

or further, by a specific (custom) chip whose hardware and software resources will have been optimized to perform the functions that are the object of the invention: a chip that is or is not microprogrammable, packaged separately or else all or part of a coprocessor installed in a microcontroller or microprocessor, etc.

Also, the invention comprises all the technical equivalents applied to an internal combustion engine regardless of its combustion cycle (2 cycle, 4 cycle), the fuel used Diesel or gasoline or further, the number of its cylinders.

What is claimed as new and desired to be secured by Letters Patent is:

1. Process for controlling the exhaust gas recirculation system of an internal combustion engine (1) of the type comprising a pipe (4) assuring the connection between the exhaust manifold (3) and the intake manifold (2), said pipe being equipped with an E.G.R. valve (5) controlled from the electronic system (6) for engine control to assure the recirculation of a given rate of exhaust gas, said engine control system being equipped with means for calculating the values $Tm\_i$ of a representative magnitude of the torque produced by each of the combustions of the engine, characterized in that it comprises the following operations:

control the E.G.R. valve from the operating conditions of the engine to obtain a predetermined exhaust gas recirculation rate R;

then calculate from each representative value $Tm\_i$ of the torque, a representative statistical magnitude $ATm\_i$ of the average of the values $Tm\_i$;

calculate the deviation $DTm\_i$ of the value $Tm\_i$ from the average $ATm\_i$;

associate with each value $DTm\_i$, and depending on the operating conditions of the engine, a value $Ra\_i$ corresponding to the rate of exhaust gas actually recirculated;

compare the value $Ra\_i$ with the value R of the rate of recirculation initially controlled and deduce from it, in case of difference, a malfunction of the E.G.R. valve.

2. Process for regulating the speed of rotation of an engine according to claim 1, wherein the values $Ra\_i$ of the actual rate of recirculation of the exhaust gases at the intake are deduced from a specific mapping contained in the engine control system.

3. Process for regulating the speed of rotation of an engine according to claim 1, wherein the deviation $DTm\_i$ between $Tm\_i$ and $ATm\_i$ is obtained with the formula of the standard deviation.

4. Process for regulating the speed of rotation of an engine according to claim 3, wherein the values $Ra\_i$ of the actual rate of recirculation of the exhaust gases at the intake are deduced from a specific mapping contained in the engine control system.

5. Process for controlling the exhaust gas recirculation system according to claim 1, wherein the values $ATm\_i$ of said statistical magnitude are calculated from the following formula:

$$ATm\_i = ATm\_i-1 + ((Tm\_i - (ATm\_i-1))/F1)$$

where F1 is a filtering constant and where $ATm\_0 = 0$.

6. Process for regulating the speed of rotation of an engine according to claim 5, wherein the values $Ra\_i$ of the actual rate of recirculation of the exhaust gases at the intake are deduced from a specific mapping contained in the engine control system.

7. Process for regulating the speed of rotation of an engine according to claim 5, wherein the deviation $DTm\_i$ between $Tm\_i$ and $ATm\_i$ is obtained with the formula of the standard deviation.

8. Process for regulating the speed of rotation of an engine according to claim 7, wherein the values $Ra\_i$ of the actual rate of recirculation of the exhaust gases at the intake are deduced from a specific mapping contained in the engine control system.

9. Process for controlling the exhaust gas recirculation system according to claim 1, wherein depending on the value $Ra\_i$ obtained, the E.G.R. valve is controlled so as to cause the actual rate Ra of recirculated exhaust gas to converge on the rate R.

10. Process for regulating the speed of rotation of an engine according to claim 9, wherein the values $Ra\_i$ of the actual rate of recirculation of the exhaust gases at the intake are deduced from a specific mapping contained in the engine control system.

11. Process for regulating the speed of rotation of an engine according to claim 9, wherein the deviation $DTm\_i$ between $Tm\_i$ and $ATm\_i$ is obtained with the formula of the standard deviation.

12. Process for regulating the speed of rotation of an engine according to claim 11, wherein the values $Ra\_i$ of the actual rate of recirculation of the exhaust gases at the intake are deduced from a specific mapping contained in the engine control system.

13. Process for controlling the exhaust gas recirculation system according to claim 9, wherein the values $ATm\_i$ of said statistical magnitude are calculated from the following formula:

$$ATm\_i = ATm\_i-1 + ((Tm\_i - (ATm\_i-1))/F1)$$

where F1 is a filtering constant and where $ATm\_0 = 0$.

14. Process for regulating the speed of rotation of an engine according to claim 13, wherein the values $Ra\_i$ of the actual rate of recirculation of the exhaust gases at the intake are deduced from a specific mapping contained in the engine control system.

15. Process for regulating the speed of rotation of an engine according to claim 13, wherein the deviation $DTm\_i$ between $Tm\_i$ and $ATm\_i$ is obtained with the formula of the standard deviation.

16. Process for regulating the speed of rotation of an engine according to claim 15, wherein the values $Ra\_i$ of the actual rate of recirculation of the exhaust gases at the intake are deduced from a specific mapping contained in the engine control system.

* * * * *